United States Patent [19]

Schmitz

[11] Patent Number: 4,861,413

[45] Date of Patent: Aug. 29, 1989

[54] WELDING AND CUTTING TONGS FOR A FILM OF SYNTHETIC MATERIAL

[75] Inventor: Roger Schmitz, Vittel, France

[73] Assignee: Societe Generale Des Eaux Minerales de Vittel, Vittel, France

[21] Appl. No.: 173,530

[22] Filed: Mar. 2, 1988

[30] Foreign Application Priority Data

Jul. 2, 1986 [FR] France ............... 86 09701

[51] Int. Cl.⁴ .............. B29C 65/74; B65B 61/10
[52] U.S. Cl. .................. 156/515; 156/251; 156/518; 156/530
[58] Field of Search ........... 156/251, 515, 518, 530, 156/580, 581, 583.2

[56] References Cited

U.S. PATENT DOCUMENTS

| | | | |
|---|---|---|---|
| 2,796,913 | 6/1957 | Fenner et al. | 156/251 |
| 2,961,031 | 11/1960 | Fenner | 156/515 |
| 3,198,685 | 8/1965 | Kopito et al. | 156/251 |
| 3,253,122 | 5/1966 | Kochmer et al. | 156/251 |
| 3,393,291 | 7/1968 | Tucker | 156/515 |

FOREIGN PATENT DOCUMENTS 0005615 2/1972 Japan ................... 156/251

Primary Examiner—Caleb Weston
Attorney, Agent, or Firm—Weiser & Stapler

[57] ABSTRACT

An apparatus for welding and cutting a film of single-layer or multi-layer synthetic material includes two jaws which are movable relative to one another. One of the jaws has a welding contact zone which includes a strip which has a groove of substantially v-shaped cross-section separating a pair of wings parallel to the edge of the corresponding jaw. The other of the jaws is equipped with a means for cutting the film which includes a wire of circular cross-section projecting relative to the edge of the jaw which supports it, so that the wire and the groove can interact with one another to make the cut as the weld is performed by the wings of welding strip.

10 Claims, 1 Drawing Sheet

WELDING AND CUTTING TONGS FOR A FILM OF SYNTHETIC MATERIAL

The subject of the present invention is welding and cutting tongs for a film of single-layer or multi-layer synthetic material, of a type comprising two jaws movable relative to one another, one of the jaws having a welding contact zone and the other being equipped with a means for cutting the film.

Devices of this type have been known per se for a long time.

They have a certain number of disadvantages, particularly as regards the durability of the weld.

Moreover, whether they are of the type with a heating blade or of the type with a cutting blade, the blade always tends to become soiled either as a result of direct contact with the film (heating blade) or because it is heated as a result of its proximity to the welding elements (non-heating cutting blade).

The device therefore tends to become soiled.

The invention proposes to overcome these disadvantages of the devices of the prior art.

According to the invention, this result is achieved with welding and cutting tongs for a film of single-layer or multi-layer synthetic material, of the type comprising two jaws movable relative to one another, one of the jaws having a welding contact zone and the other being equippd with a means for cutting film, characterised in that, on the one hand, the welding contact zone consists essentially of a strip which has a groove of substantially v-shaped cross-section extended by two wings parallel to the edge of the corresponding jaw and, on the other hand, the means for cutting the film consists of a wire of circular cross-section protecting relative to the edge of the jaw supporting it, the wire and the groove interacting with one another to make the cut.

The invention will be understood better from the following description of an embodiment given as a non-limiting example, with reference to the accompanying drawings in which.

Figure 1:
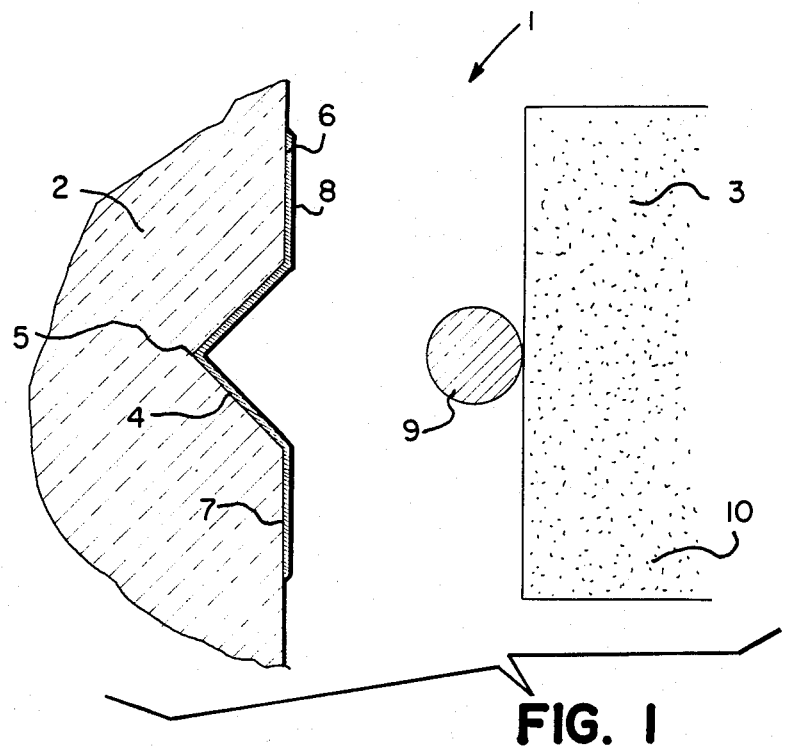
FIG. 1 is a diagrammatic sectional view of welding tongs according to the invention in the position of rest.

The welding and cutting tongs (1) are composed essentially of two jaws (2) and (3) movable relative to one another.

The jaw (2) supports a metallic welding strip (4) having a groove (5) of substantially v-shaped cross-section, the branches of which are extended by two wings (6,7) parallel to the edge of the said jaw.

The strip (4) is covered with an electrical insulator (8) which, because of its fineness, makes it possible to transmit heat and which consists, for example, of teflon. Another advantage of teflon is that it has a low coefficient of adhesion.

The strip is fed in a way known per se in order to carry out welding, for example, but in a non-limiting way, in order to carry out pulse welding.

The jaw (3) for its part supports a cutting wire (9) of circular cross-section. This wire projects relative to the edge of the jaw (3) and is partially embedded in a mass of elastic material (10), for example silicone, which serves as an abutment for the wings (6,7) of the other jaw. During the welding operation, the wire (9) is retracted slightly into the mass (10).

Optionally, the wire (9) can also be heated.

Figure 2:
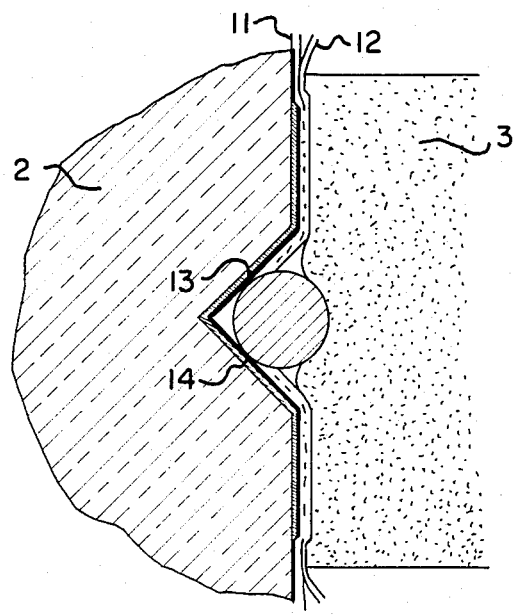
FIG. 2 is a diagrammatic sectional view of welding tongs according to the invention in the operating position.

During the welding and cutting operation shown in FIG. 2, the two film thicknesses (11,12) are welded by means of the wings (6,7) interacting with the mass (10), whilst the wire (9) cuts the two film thicknesses at its points of contact (13,14) with the groove (5).

It has been found that this device has considerable advantages in relation to the devices of the prior art, namely in particular :

an increase in mechanical durability of the weld;
excellent cutting, whether heat is supplied to the wire or not;
the absence of any deposit of film on the elements coming in contact with it;
self-alignment of the two elements as a result of their matching male and female shapes.

Furthermore, conventional cutting blades obtained by wire-drawing have an edge the angle of which is never very sharp. With the device according to the invention, the cutting effect can be varied with a larger or smaller diameter.

In addition, the wires used are sold coated with teflon and require only slight heating to function, thus proportionately limiting the risks of soiling.

It will be fully appreciated that many modifications can be made without departing from the scope of the invention.

Thus, the shape of the wire and of the groove can be modified slightly. For example, the groove can be rounded as a function of the composition of the film and/or the thickness. Likewise, the diameter of the wire and the angle of the groove can be varied.

I claim:

1. An apparatus for welding and cutting a film formed of a single-layer or a multi-layer synthetic material and including a pair of jaws movable relative to one another and comprising:
    a first jaw which includes a welding contact zone formed as a strip having a substantially v-shaped groove and a pair of wings extending from opposite sides of the v-shaped groove; and
    a second jaw which includes means for cutting the film formed of a wire of generally circular cross-section and projecting from the second jaw so that the wire and the groove can cooperate with one another to cut the film as the film is welded together by the welding contact zone of the first jaw.

2. The apparatus of claim 1 wherein the film is welded by the wings of the first jaw.

3. The apparatus of claim 1 wherein the wings of the first jaw are substantially parallel with a face of the first jaw.

4. The apparatus of claim 1 wherein the strip is covered with a layer of electrical insulation which also permits the transfer of heat.

5. The apparatus of claim 4 wherein the layer of electrical insulation is formed of teflon.

6. The apparatus of claim 1 wherein the strip is electrically coupled with pulse welding means.

7. The apparatus of claim 1 wherein the wire is heated.

8. The apparatus of claim 1 wherein the wire is partially embedded in a mass elastomeric material forming the second jaw.

9. The apparatus of claim 8 wherein the elastomeric material is silicone.

10. The apparatus of claim 8 wherein the mass serves as an abutment for the wings, and receives portions of the wire during said welding and cutting.

* * * * *